United States Patent Office 2,700,031
Patented Jan. 18, 1955

2,700,031

2-KETO-5-IMINO-4-AMINO-4-UREIDO-IMIDAZOLI- DINE ALDEHYDE RESINS

Thomas Boyd, Springfield, and Henry A. Walter, Long- meadow, Mass., assignors to Monsanto Chemical Com- pany, St. Louis, Mo., a corporation of Delaware No Drawing. Application October 7, 1950, Serial No. 189,051

5 Claims. (Cl. 260—67.5)

This invention relates to new aminoplasts. More partic- ularly, the invention relates to derivatives of 2-keto-5- imino-4-amino-4-ureido-imidazolidine.

One object of this invention is to provide new amino- plasts.

A further object of this invention is to provide resinous derivatives of 2-keto-5-imino-4-amino-4-ureido-imidazoli- dine.

Another object is to provide 2-keto-5-imino-4-amino-4- ureido-imidazolidine-aldehyde reaction products.

Still another object is to provide ethers of aldehyde-2- keto-5-imino-4-amino-4 - ureido - imidazolidine reaction products.

These and other objects are attained by reacting 2-keto- 5-imino-4-amino-4-ureido-imidazolidine with aldehydes to form thermosetting resins which may be further modified by reaction with organic hydroxy compounds.

The following examples are given in illustration and are not intended as limitations on the scope of this invention. Where parts are mentioned, they are parts by weight.

*Example I*

2-keto-5-imino-4-amino-4-ureido-imidazolidine was pre- pared by the oxidation of uric acid using potassium ferri- cyanide as an oxidizing agent according to the method described by Denicke in Liebig's Annalen, vol. 349, pp. 286–287. The oxidation product was dissolved in sodium hydroxide, the solution was filtered to remove impurities and the 2-keto-5-imino-4-amino-4-ureido-imidazolidine was precipitated with sulfuric acid. The precipitate was recovered by filtration and thoroughly washed to yield a white, crystalline material soluble in alkalies and insoluble in acids. On analysis, the product was found to be sub- stantially pure 2-keto-5-imino-4-amino-4-ureido-imidazo- lidine.

2-keto-5-imino-4-amino-4-ureido-imidazolidine may be represented by the following formula:

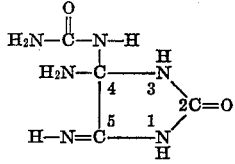

*Example II*

1 mol of 2-keto-5-imino-4-amino-4-ureido-imidazolidine and 4 mols of formaldehyde in the form of a 37% solu- tion in water were mixed with sufficient sodium hydroxide to attain and maintain a pH of 8–9. The solution was then refluxed for about one hour at atmospheric pressure to obtain a solution of tetramethylol-2-keto-5-imino-4- amino-4-ureido-imidazolidine. The water was then re- moved by vacuum distillation to yield a slightly yellow, solid, brittle resin. The resin was soluble in alcohols, ketones and other common solvents.

*Example III*

100 parts of the dry resin made according to Example II were mixed dry with 100 parts of wood flour. The mixture was placed in a disc mold and cured at 120° C. for 10 minutes. The disc produced was hard, non-brittle and had a glossy surface. It was found that the disc produced had dimensions almost exactly those of the die used and that only infinitesimal shrinkage had occurred during the curing and cooling.

*Example IV*

1 mol of resin produced as shown in Example II was dissolved in 6 mols of methanol. 0.1 mol of formic acid in aqueous solution was added to the methanol solution which was boiled under reflux at atmospheric pressure for about one hour to produce a methanol solution of the tetramethyl ether of tetramethylol 2-keto-5-imino-4-amino- 4-ureido-imidazolidine. The excess methanol was re- moved by vacuum distillation to yield a slightly yellow, clear, liquid resin. The resin was soluble in water and organic solvents.

The ether resin could be cured to a solid, insoluble, infusible state by heating it at from 100° C. to 150° C. with or without the aid of an acid curing catalyst. It was compatible with alkyd resins to produce a high gloss coating composition having excellent weathering proper- ties. It could be applied to textiles and cured thereon without the use of acid catalysts, to shrinkproof and creaseproof the fabrics and to greatly diminish chlorine absorption of the fabrics during subsequent bleaching operations.

2-keto-5-imino-4-amino-4-ureido-imidazolidine may be reacted with other aldehydes than the formaldehyde shown in Example II or a mixture of aldehydes may be used. Among the useful aldehydes are formaldehyde, acetalde- hyde, benzaldehyde, cinnamaldehyde, crotonaldehyde, acrolein, methacrolein, furfural, etc. The amount of alde- hyde which will react with the acid may vary from less than 1 mol to 8 mols per mol of 2-keto-5-imino-4-amino-4- ureido-imidazolidine. An excess of aldehyde or aldehyde mixture beyond 8 mols may be used, the excess being re- moved after the reaction is complete. The pH of the reaction medium may vary between about 8 and 9, sodium or other alkali metal hydroxide or ammonium hydroxide, or suitable buffers being used to maintain the desired pH.

The resins thus obtained are slightly colored, fusible and soluble in alcohols, ketones, etc. They may be cured to an insoluble, infusible state by heating them with or without acid curing catalysts such as ethyl sulfonic acid at a temperature from about 100° C. to about 200° C. An especially advantageous feature of the resins is the almost complete absence of shrinkage during the curing and cooling operations. This features permits the prepa- ration of molded articles within exceptionally close toler- ances for precision molding uses.

The resins may be mixed before molding with other curable aminoplasts such as aldehyde condensation prod- ucts of urea, thiourea, dicyandiamide, guanidines, amino- triazines, e. g., melamines, etc. to decrease the shrinkage of such aminoplasts during molding operations. Likewise, mixtures of the imidazolidine may be mixed with one or more of these compounds and the mixture condensed si- multaneously with the aldehyde.

Conventional additives such as fillers, dyes, pigments, lubricants, etc. may be mixed with the new resins prior to the molding operations.

As typified in Example IV, the aldehyde condensation products of 2-keto-5-imino-4-amino-4-ureido-imidazoli- dine may be further reacted with organic hydroxyl-con- taining bodies such as alcohols and phenols under acid conditions to provide ether resins for use in coating com- positions alone or in combination with alkyd resins, and for use as textile or paper treating agents. Among the al- cohols and phenols which may be used are methanol, eth- anol, butanol, octanol, cetyl alcohol, stearyl alcohol, phenol, alkyl phenols, cresols, resorcinol, xylenols, allyl alcohol, crotyl alcohol, benzyl alcohol, cinnamyl alcohol, etc. A mixture of two or more alcohols may be used in which case an excess of the lower alcohol is frequently reacted first and then the higher alcohol or phenol is re- acted to exchange alcohol groups.

The amount of alcohol or phenol used may vary ac- cording to the amount of aldehyde reacted with the 2- keto-5-imino-4-amino-4-ureido-imidazolidine or may be substantially less than that amount. The maximum amount of alcohol or phenol which can be made to react is 8 mols per mol of octa-alkylol derivative of 2-keto-5- imino-4-amino-4-ureido-imidazolidine. An excess of al- cohol or phenol may be used.

According to another embodiment of this invention, 2-keto-5-imino-4-amino-4-ureido-imidazolidine may be reacted simultaneously with an aldehyde and an alcohol or phenol under acid conditions to produce ethers of the alkylol derivatives of 2-keto-5-imino-4-amino-4-ureido-imidazolidine.

The ether resins obtained by either method are compatible with alkyd resins and are valuable for increasing the adhesion of alkyd resins to metal, glass, ceramics, etc. and in diminishing the tendency of the alkyd resins to shrink away from coated surfaces. They are also valuable for treating textiles to shrinkproof and creaseproof the textiles, to diminish the chlorine pickup of the treated fabrics during subsequent bleaching operations, and to serve as a fixing agent for dyestuffs.

It is obvious that many variations may be made in the products and processes of this invention without departing from the spirit and scope thereof as defined in the appended claims.

What is claimed is:

1. A thermosetting resin comprising the condensation product of 2-keto-5-imino-4-amino-4-ureido-imidazolidine and an aldehyde.
2. A thermosetting resin comprising the condensation product of 2-keto-5-imino-4-amino-4-ureido-imidazolidine and formaldehyde.
3. A thermosetting resin comprising the condensation product of 2-keto-5-imino-4-amino-4-ureido-imidazolidine, an aldehyde and a compound taken from the group consisting of alcohols and phenols.
4. A thermosetting resin comprising the condensation product of 1 mol of 2-keto-5-imino-4-amino-4-ureido-imidazolidine and 4 mols of formaldehyde.
5. A thermosetting resin comprising the condensation product of 1 mol of 2-keto-5-imino-4-amino-4-ureido imidazolidine, 4 mols of formaldehyde and 6 mols of methanol.

References Cited in the file of this patent

UNITED STATES PATENTS

| | | |
|---|---|---|
| 2,332,303 | D'Alelio | Oct. 19, 1943 |
| 2,514,353 | Walter | July 4, 1950 |

OTHER REFERENCES

Denicke Annalen der Chemie, vol. 349, pages 269–298 (pages 279–292 of interest).